(12) United States Patent
Raphaeli et al.

(10) Patent No.: US 6,616,254 B1
(45) Date of Patent: Sep. 9, 2003

(54) CODE SHIFT KEYING TRANSMITTER FOR USE IN A SPREAD SPECTRUM COMMUNICATIONS SYSTEM

(75) Inventors: Dan Raphaeli, Kfar Saba (IL); Avner Matmor, Omer (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 09/449,880

(22) Filed: Nov. 30, 1999

Related U.S. Application Data

(63) Continuation-in-part of application No. 08/879,522, filed on Jun. 20, 1997, now Pat. No. 6,064,695.

(51) Int. Cl.[7] .................................................. H04B 1/69
(52) U.S. Cl. ......................................................... 325/135
(58) Field of Search .............................. 375/135, 146, 375/139, 151, 295, 296, 130; 370/320, 335, 347, 441, 210

(56) References Cited

U.S. PATENT DOCUMENTS

| | | | |
|---|---|---|---|
| 3,934,203 A | | 1/1976 | Schiff |
| 4,477,912 A | | 10/1984 | Russell |
| 5,051,916 A | * | 9/1991 | Benson .......................... 702/76 |
| 5,090,024 A | | 2/1992 | Vander Mey et al. |
| 5,155,741 A | | 10/1992 | Waters et al. |
| 5,179,572 A | * | 1/1993 | Schilling ..................... 375/145 |
| 5,204,877 A | | 4/1993 | Endo et al. |
| 5,237,587 A | | 8/1993 | Schoolcraft |
| 5,253,268 A | | 10/1993 | Omura et al. |
| 5,263,046 A | * | 11/1993 | Vander Mey ............... 375/139 |
| 5,278,862 A | | 1/1994 | Vander Mey |
| 5,307,157 A | * | 4/1994 | Kobayashi et al. ......... 348/708 |
| 5,359,625 A | | 10/1994 | Vander Mey et al. |
| 5,359,635 A | | 10/1994 | Atriss et al. |
| 5,503,159 A | * | 4/1996 | Burton ........................ 600/516 |
| 5,574,748 A | | 11/1996 | Vander Mey et al. |
| 5,671,247 A | * | 9/1997 | Souissi et al. ............... 375/144 |
| 5,687,075 A | * | 11/1997 | Stothers ........................ 700/28 |
| 5,748,669 A | | 5/1998 | Yada |
| 5,768,307 A | | 6/1998 | Schramm et al. |
| 5,885,225 A | * | 3/1999 | Keefe et al. ................. 600/559 |
| 6,026,169 A | * | 2/2000 | Fujimori ....................... 381/61 |
| 6,081,599 A | * | 6/2000 | Zinevitch .................... 380/210 |

FOREIGN PATENT DOCUMENTS

| | | | |
|---|---|---|---|
| EP | 0762664 | 3/1997 | ........... H04B/1/707 |
| EP | 0910174 | 4/1999 | ........... H04B/1/707 |
| WO | 98/59446 | 12/1998 | ........... H04B/15/00 |

* cited by examiner

*Primary Examiner*—Chi Pham
(74) *Attorney, Agent, or Firm*—Howard Zaretsky; Zaretsky & Associates PC

(57) ABSTRACT

A transmitter apparatus and method for use in a spread spectrum data communications system that utilizes the Differential Code Shift Keying (DCSK) or non-differential Code Shift Keying (CSK) modulation technique. The transmitter transmits data in the form of packets to the receiver. Each packet is consists of a header, one or more data symbols followed by a CRC checksum. The preamble comprises a sequence of one or more zero rotated symbols and one or more predetermined non-zero rotated symbols. In one embodiment, a shift index is calculated based on the input data. The shift index is used to form the address in a PN sample ROM. The PN sequence is read out using a counter of length modulo the PN sequence length. Samples of the PN sequence are read out and input to a Manchester encoder whose output is amplified and filtered to obtain a particular spectrum shape. In a second embodiment, the shift index is loaded into a counter and used as a starting address to address the PN sample ROM. The counter is cycled for a symbol period causing the entire PN sequence to be read out rotated in accordance with the input data. A FIR filter is used to filter the sample stream. Optionally, notches can be placed in the FIR frequency response to filter out specific frequencies such as those corresponding to the amateur radio band. A method of constructing a notch filter having one or more notches in its frequency response is also presented.

45 Claims, 6 Drawing Sheets

1110 0101
FIG.1
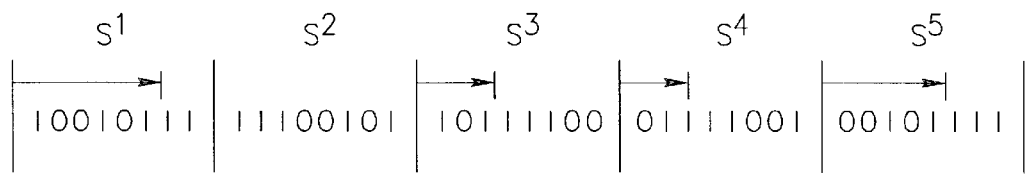
FIG.2
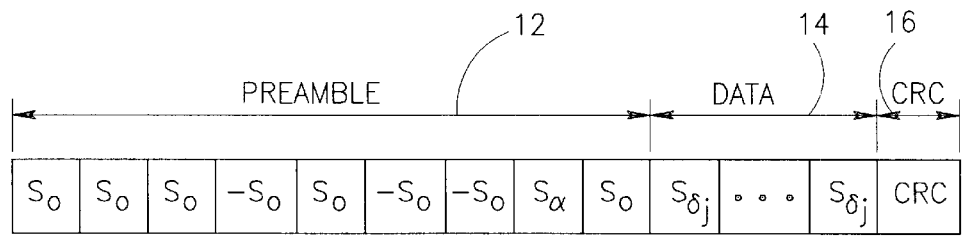
FIG.3
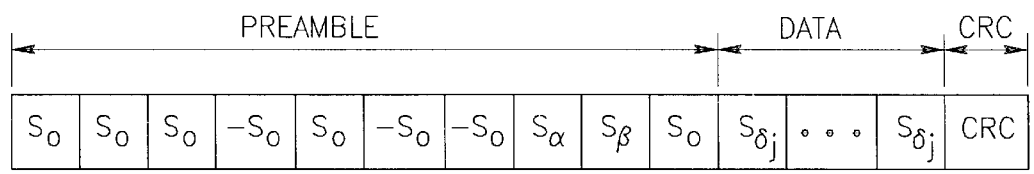
FIG.4

CODE SHIFT KEYING TRANSMITTER FOR USE IN A SPREAD SPECTRUM COMMUNICATIONS SYSTEM

REFERENCE TO RELATED APPLICATIONS

This application is a continuation-in-part of U.S. application Ser. No. 08/879,522, filed Jun. 20, 1997, now U.S. Pat. No. 6,064,695, entitled "Spread Spectrum Communication System Utilizing Differential Code Shift Keying," similarly assigned and incorporated herein by reference in its entirety.

FIELD OF THE INVENTION

The present invention relates generally to data communication systems and more particularly relates to a transmitter for use in a spread spectrum communication system.

BACKGROUND OF THE INVENTION

The use of spread spectrum communications techniques to improve the reliability and security of communications is well known and is becoming more and more prevalent. Spread spectrum communications transmits data utilizing a spectrum bandwidth much greater than the bandwidth of the data to be transmitted. This provides for more reliable communication in the presence of high narrowband noise, spectral distortion and pulse noise, in addition to other advantages. Spread spectrum communication systems typically utilize correlation techniques to identify an incoming received signal.

Spread spectrum communications systems are commonly used in military environments to overcome high energy narrowband enemy jamming. In commercial or home environments it may be used to achieve reliable communication on noisy media such as the AC powerline. In particular, certain home electrical appliances and devices can potentially be very disruptive of communications signals placed onto the powerline. For example, electronic dimming devices can place large amounts of noise onto the powerline since these devices typically employ switching devices, such as triacs or silicon controlled rectifiers (SCRs), to control the AC waveform in implementing the dimming function.

A communication medium such as the AC powerline may be corrupted by fast fading, unpredictable amplitude and phase distortion and additive noise. In addition, communication channels may be subjected to unpredictable time varying jamming and narrowband interference. In order to transmit digital data over such channels it is preferable to use as wide a bandwidth as possible for transmission of the data. This can be achieved using spread spectrum techniques.

One common type of spread spectrum communications, called direct sequence spread spectrum, is generated by first modulating the digital data and then multiplying the result with a signal having particularly desirable spectral properties, such as a pseudo noise (PN) sequence. The PN sequence is a periodic sequence of bits having a particular period. Each bit in the sequence is termed a chip. The sequence has the property of having very low autocorrelation for delays larger than one chip. In some systems, the PN sequence is replaced by a chirp waveform. Several techniques are available for use by the transmitter in modulating the data signal, including biphase shift keying (BPSK) and continuous phase modulation (CPM) techniques. Another modulation technique is minimum shift keying (MSK), which is a known variation of CPM.

The spread spectrum receiver is required to perform synchronization that is commonly implemented using an acquisition method in combination with a tracking loop or other tracking mechanism. In a noisy unpredictable environment such as the AC powerline, the tracking loop typically fails frequently causing loss of information. Communication, systems to overcome these problems are large, complex and expensive. In addition, these systems typically succeed at transmitting only one or more bits per symbol.

Receiving and demodulating signals that have been subject to PN modulation requires that the same PN code sequence be generated in the receiver and correlated with the received signal to extract the data modulation. One type of correlation technique employs a digital matched filter to compare the received digital signal with the locally generated version of the PN code. The digital filter produces an in phase (I) signal and a quadrature (Q) signal from which a digital demodulator such as a Differential Phase Shift Keying (DPSK) demodulator can derive data values. Another function of the digital matched filter is to produce correlation measurements from which synchronization signals can be generated.

In despreading a spread spectrum signal, the receiver produces a correlation pulse in response to the received spread spectrum signal when the received spread spectrum signal matches the chip sequence to a predetermined degree. Various techniques are available for correlating the received signal with the chip sequence, including those using surface acoustic wave (SAW) correlators, tapped delay line (TDL) correlators, serial correlators, and others.

SUMMARY OF THE INVENTION

The present invention is a transmitter apparatus and method for use in a spread spectrum data communications system that utilizes the Differential Code Shift Keying (DCSK) or non-differential Code Shift Keying (CSK) modulation technique. Such communications systems are applicable to relatively noisy environments such as the AC powerline.

In a CSK transmission system, the data is transmitted in the form of time shifts between consecutive circularly rotated waveforms of length T which are referred to as spreading waveforms, i.e., spread spectrum correlator sequence waveforms. The spreading waveforms can comprise any type of waveform that has suitable autocorrelation properties. During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform (also referred to as a chirp) before it is transmitted.

In addition to conveying information in the shift applied to the spreading sequence, additional information can be conveyed in the sign of the symbol or more generally in its phase if there is a carrier present.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

Upon reception by the receiver, the signal is input to a matched filter having a template of the spreading waveform pattern to detect the amount of rotation (or circular shift)

within the received signal for each symbol. The received data is fed into a shift register and circularly rotated, i.e., shifted. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

The transmitter transmits data in the form of packets to the receiver. Each packet is preceded by a preamble comprising a predetermined number of symbols. The length of the preamble can be any suitable number of symbols such that the receiver is able to synchronize with the transmitter. The preamble comprises a sequence comprising any number of zero rotated symbols (or symbols with a constant fixed rotation) followed by any number of non-zero rotated symbols having a known predetermined random shift. The rotation that is applied to each symbol is independent of the rotation applied to other symbols.

In a first embodiment, the shift-index, i.e., the data received from a host source, is used to calculate an initial index. The initial index is used in combination with a counter to address a modulation waveform sample Read Only Memory (ROM). The modulation waveform may be any suitable waveform having good correlation properties. Examples of suitable waveforms include chirp waveforms and Pseudo Noise (PN) sequence waveforms.

The waveform samples are clocked out of the sample ROM starting from a position corresponding to the initial index. This yields a rotated symbol having a degree of rotation corresponding to the data to be transmitted. The number of unique symbols determines the number of bits transmitted in each symbol. An additional bit can be encoded in the transmitted signal by setting the sign of the symbol. Each symbol can have a positive or negative sign (or phase), i.e., non-inverted or inverted. Thus, an additional bit can be transmitted in addition to the bits conveyed in the rotation of the modulation waveform. If a carrier is also transmitted then, utilizing a suitable modulation such as MPSK, more than one bit can conveyed by the phase of the carrier.

The rotated sample bit stream is then encoded by a Manchester encoder, amplified using a digital buffer, such as a CMOS gate, and filtered via a band pass filter. The BPF provides any desired spectral shaping to the output waveform. The signal is then coupled to the communications channel via suitable circuitry. In the case of an AC power line channel, a signal transformer is used coupled to a high pass filter.

In a second embodiment, a FIR filter, D/A converter and operational amplifier are used in place of the Manchester encoder. The FIR filter is adapted to band pass filter the input signal and to provide one or more notches at stop bands within the pass band. These notches correspond to special frequencies wherein transmission may not be permitted (depending on the location). The notch frequencies may correspond, for example, with one or more amateur frequency bands that lie within the pass band, e.g., 4 to 20 MHz. The D/A converter and op amp function to convert the digital output of the FIR filter to an analog signal.

The invention further discloses a method of constructing a filter having one or more notches in the frequency domain. The method comprises inverting the phase of the real frequency response at each frequency it is desired to have a notch. An inverse FFT is performed and a window function is applied to the resulting time domain representation of the frequency response. The results of the windowing function are quantized, scaled, etc. and the filter tap coefficients generated therefrom.

There is provided in accordance with the present invention a transmitter for use in a spread spectrum communications system comprising an initial index calculator operative to generate an initial index in accordance with a shift index input from a host data source, a sequence memory adapted to hold a modulation waveform sequence, a counter operative to count modulo the length of the modulation waveform sequence so as to generate a complete sequence of samples rotated by an amount in accordance with the initial index, each complete sequence of samples representing a symbol, an encoder operative to encode the rotated sequence sample stream so as to shift the spectrum thereof, an amplifier adapted to generate sufficient drive current to drive a channel over which the symbols are to be transmitted, a filter adapted to spectrally shape the signal output of the amplifier and channel coupling circuitry operative to couple the filtered signal output from the filter onto the channel media.

The modulation waveform may comprise a Pseudo Noise (PN) sequence or a chirp waveform. The initial index is calculated in accordance with the following $$\text{initial\_index} = \left(\frac{\text{PN sequence length}}{\text{number of possible shifts}}\right) \cdot \text{shift\_index}$$

wherein the shift index comprises the data input from the host data source. The sequence sample memory comprises a Read Only Memory (ROM) storage device and the amplifier is adapted to generate a differential output. The filter may comprise a band pass filter, e.g., symmetrical band pass filter, having a pass band from 4 to 20 MHz and having one or more notches. The channel coupling circuitry comprises a signal transformer coupled to a symmetrical high pass filter. The transmitter further comprises means for encoding a bit received from the host data source as the sign of the rotated sequence. The encoder comprises a Manchester encoder.

The amplifier comprises a non-inverting gate and an inverting gate adapted to be driven in parallel by the output of the encoder so as to generate a differential output signal or a single non-inverting gate adapted to be driven by the output of the encoder. The single non-inverting gate comprises tri-state control means. Alternatively, the amplifier comprises a single inverting gate adapted to be driven by the output of the encoder.

There is further provided in accordance with the present invention a transmitter for use in a spread spectrum communications system comprising an initial index calculator operative to generate an initial index in accordance with a shift index input from a host data source, a counter operative to count modulo the length of a modulation waveform sequence for each symbol to be transmitted, the counter beginning at a point in the sequence corresponding to the initial index, a sequence sample memory adapted to generate the modulation waveform sequence rotated by an amount in accordance with the initial index in response to the output of the counter, a first filter operative to encode the rotated sequence sample stream so as to shift the spectrum thereof, an amplifier adapted to generate sufficient drive current to drive a channel over which the symbols are to be transmitted, a second filter adapted to spectrally shape the signal output of the amplifier and channel coupling circuitry operative to couple the filtered signal output from the filter onto the channel media.

The transmitter further comprises means for encoding a bit received from the host data source as the sign of the rotated sequence. The sequence sample memory comprises a Read Only Memory (ROM) storage device. The first filter comprises a Finite Impulse Response (FIR) filter adapted to function as a band pass filter with a pass band from 4 to 20 MHz. Alternatively, the first filter comprises a Finite Impulse Response (FIR) filter band pass filter having one or more notches in its pass band. The amplifier comprises a differential amplifier adapted to output a differential output signal.

There is also provided in accordance with the present invention, in a spread spectrum communications system, a method for transmitting symbols onto a communications channel, the method comprising the steps of providing a sample memory comprising samples of a modulation waveform sequence to be transmitted each symbol period, calculating an initial index into the sequence sample memory in accordance with a shift index received a host data source, generating a sample bit stream comprising the sequence rotated in accordance with the initial index, encoding the sample bit stream output of the sample memory and coupling the encoded sample bit stream onto the communication channel.

The method further comprises means for encoding a bit received from the host data source as the sign of the rotated sequence. The method further comprises the step of amplifying the encoded sample bit stream so as to provide sufficient drive current to drive the communication channel. The method further comprises the step of spectrally shaping the encoded bit stream so as to notch out one or more frequencies.

There is still further provided in accordance with the present invention a method for constructing a filter having one or more notches in its frequency response, the method comprising the steps of determining the desired frequency response including one or more notches to be placed at one or more frequencies, inverting the phase of the frequency response at each notch frequency such that a zero crossing is generated for each notch frequency desired in the frequency response, performing an inverse FFT on the resulting frequency response, applying a windowing function to the resulting time domain representation of the frequency response and generating filter tap coefficients from the results of the windowing function.

There is also provided in accordance with the present invention a transmitter for use in a spread spectrum communications system comprising an initial index calculator operative to generate an initial index in accordance with a shift index input from a host data source, a sequence memory adapted to hold a modulation waveform sequence, a counter operative to count modulo the length of the modulation waveform sequence so as to generate a complete sequence of samples rotated by an amount in accordance with the initial index, each complete sequence of samples representing a symbol, an encoder operative to encode the rotated sequence sample stream so as to shift the spectrum thereof, a filter adapted to spectrally shape the signal output of the encoder, wherein the filter comprises one or more notches in the frequency domain with phase that alternates in sign, a zero crossing in the frequency response occurring at each desired notch frequency and channel coupling circuitry operative to couple the filtered signal output from the filter onto the channel media.

The channel coupling circuitry comprises a digital to analog (D/A) converter operative to convert the output of the filter so as to generate an analog output signal and amplifier means operative to receive the analog output signal and to generate sufficient drive current in response thereto to drive the channel over which the symbols are to be transmitted and interface circuitry adapted to couple the output of the amplifier to the channel.

There is further provided in accordance with the present invention a transmitter comprising means for generating a transmission signal in accordance with data received from a host data source, a filter adapted to spectrally shape the transmission signal, wherein the filter comprises one or more notches in the frequency domain with phase that alternates in sign, a zero crossing in the frequency response occurring at each desired notch frequency and channel coupling circuitry operative to couple the filtered signal output from the filter onto the channel media.

There is also provided in accordance with the present invention, in a spread spectrum communications system, a method for transmitting symbols onto a communications channel, the method comprising the steps of providing a sample memory comprising samples of a modulation waveform sequence to be transmitted each symbol period, calculating an initial index into the sequence sample memory in accordance with a shift index received a host data source, generating a sample bit stream comprising the sequence rotated in accordance with the initial index, encoding the sample bit stream output of the sample memory, filtering the sample bit stream output of the sample memory utilizing a filter constructed to comprise one or more notches in the frequency domain whereby the phase of the frequency response is inverted at each desired notch frequency such that a zero crossing is generated for each notch frequency desired in the frequency response and whereby a windowing function is applied to the time domain representation of the response and the results quantized to yield a plurality of filter tap coefficients and coupling the encoded sample bit stream onto the communication channel.

BRIEF DESCRIPTION OF THE DRAWINGS

The invention is herein described, by way of example only, with reference to the accompanying drawings, wherein:

FIG. 1 is an illustration of a sample Pseudo Noise (PN) sequence suitable for use with the transmitter of the present invention;

FIG. 2 is an illustration of a series of PN sequences, each of which was generated by rotating the sequence pattern of FIG. 1 by an amount in accordance with the data to be transmitted;

FIG. 3 is an illustration of the structure of the packet used in the communication protocol of the communications system of the present invention wherein the preamble comprises a single non-zero rotated symbol;

FIG. 4 is an illustration of the structure of the packet used in the communication protocol of the communications system of the present invention wherein the preamble comprises more than one non-zero rotated symbol;

DETAILED DESCRIPTION OF THE INVENTION

Notation Used Throughout

Figure 5:
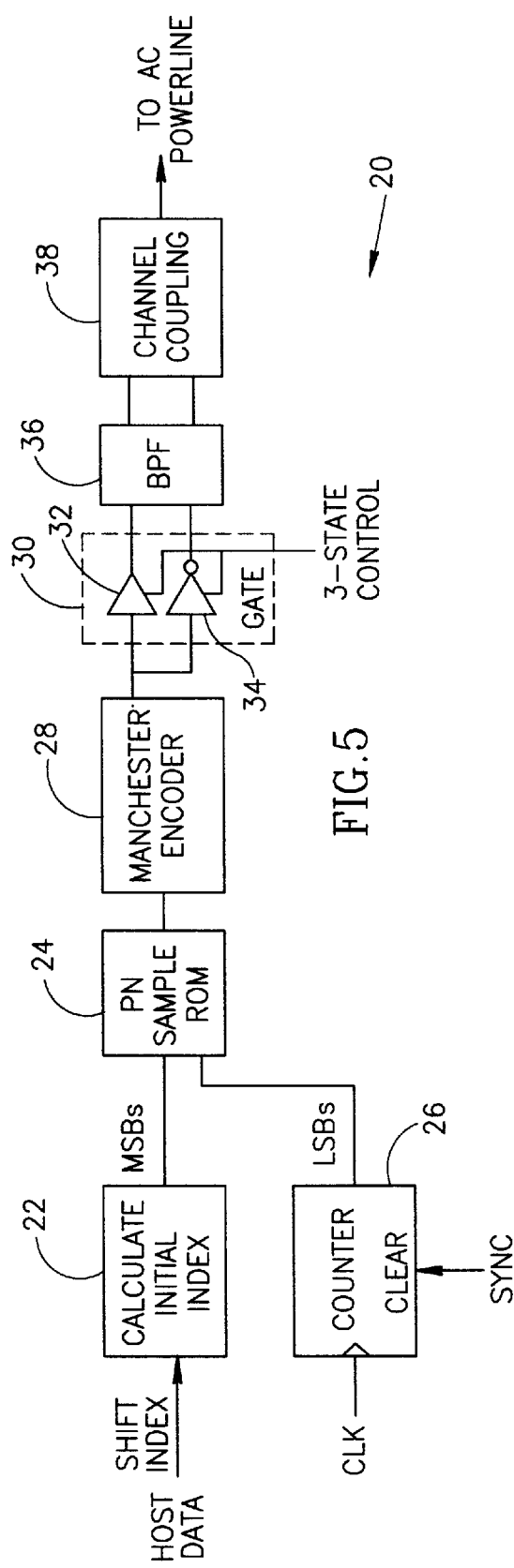
FIG. 5 is a block diagram illustrating a first embodiment of the transmitter of the present invention wherein the output of the sample ROM is Manchester encoded.

The following notation is used throughout this document.

| Term | Definition |
| --- | --- |
| AC | Alternating Current |
| BPF | Band Pass Filter |
| BPSK | Binary Phase Shift Keying |
| CMOS | Complementary Metal Oxide Semiconductor |
| CPM | Continuous Phase Modulation |
| CRC | Cyclic Redundancy Check |
| CSK | Code Shift Keying |
| DCSK | Differential Code Shift Keying |
| DPSK | Differential Phase Shift Keying |
| FFT | Fast Fourier Transform |
| FIR | Finite Impulse Filter |
| MPSK | M-ary Phase Shift Keying |
| MSK | Minimum Shift Keying |
| PN | Pseudo Noise |
| ROM | Read Only Memory |
| SAW | Surface Acoustic Wave |
| SCR | Silicon Controlled Rectifier |
| SNR | Signal to Noise Ratio |
| SR | Shift Register |
| TDL | Tapped Delay Line |
| UST | Unit Symbol Time |

Code Shift Keying (CSK)/Differential Code Shift Keying (DCSK)

The present invention is a transmitter apparatus and method for use in a spread spectrum data communications system that utilizes the Differential Code Shift Keying (DCSK) or non-differential Code Shift Keying (CSK) modulation technique. Such communications systems are applicable to relatively noisy environments such as the AC powerline. The present invention is applicable to spread spectrum data communications systems such as those described in "Spread Spectrum Communication System Utilizing Differential Code Shift Keying," U.S. application Ser. No. 08/879,522, filed Jun. 20, 1997, now U.S. Pat. No. 6,064,695, similarly assigned and incorporated herein by reference in its entirety.

In a CSK transmission system, the data is transmitted in the form of time shifts between consecutive circularly rotated waveforms of length T which are referred to as spreading waveforms. The spreading waveforms can comprise any type of waveform that has suitable auto correlation properties.

During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform (also referred to as a chirp) before it is transmitted.

In a CSK system, the data is conveyed in the absolute shift assigned to the spreading waveform. In a DCSK system, the data is conveyed in the shift differential between consecutive symbols. The synchronization scheme of the present invention is applicable to both CSK and DCSK transmission systems.

A correlator in the receiver employs a matched filter having a template of the spreading waveform pattern to detect the amount of rotation (or circular shift) within the received signal for each symbol. The received data is fed into a shift register and circularly rotated, i.e., shifted. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. For DCSK, the differential shift index is then decoded to yield the originally transmitted data.

The transmitter transmits data in the form of packets to the receiver. Each packet is preceded by a preamble comprising a predetermined number of symbols. The length of the preamble can be any suitable number of symbols such that the receiver is able to synchronize with the transmitter. The operating environment, i.e., channel noise, level of interference, signal to noise ratio, transmit power, receiver performance all play a factor in choosing the length of the preamble.

As described above, the spread spectrum communication system transmits data in the form of a circularly rotated binary sequence signal. The binary sequence can comprise any type of direct sequence that has suitable autocorrelation properties. Preferably, however, the direct sequence comprises a Pseudo Noise (PN) sequence. An illustration of a sample binary PN sequence suitable for use with the communications system of the present invention is shown in FIG. 1. In this example an 8 bit PN sequence is shown. Note, however, that numerous different sequences can be used with the typical sequence being longer than 8 bits, e.g., 64 bits. The PN sequence is a sequence of bits having a certain time duration T. Each bit in the sequence is termed a chip.

The PN sequence is not a periodic sequence but comprises 64 bits having very low cyclic autocorrelation for delays longer than one chip. Note that such a sequence may be one period of a periodic PN sequence. Although a sequence of 64 bit is desirable to use, there is no maximal length shift register sequence of length 64. Therefore one of length 63 is taken and an additional '0' is appended to it. Adding the extra bit does effect the autocorrelation properties of the sequence but only slightly. Note that numerous other spreading sequences having adequate autocorrelation properties are also suitable for use with the present invention.

The direct sequence when represented in time, spans a certain duration which, as described previously, is termed a unit symbol time (UST). During each symbol time, a plurality of bits of information is transmitted. The data is conveyed in the amount of rotation applied to the sequence before it is transmitted. In the example communications system described herein, the range of transmission is approximately 4 to 20 MHz.

An illustration of a sample symbol stream comprising a series of binary PN sequences each of which was generated by rotating the sequence pattern of FIG. 1 by an amount in accordance with the data to be transmitted is shown in FIG. 2. Thus, during each symbol period, the PN sequence begins to be transmitted at a point in the PN sequence that corresponds to the data to be transmitted during that particular period.

With reference to FIG. 2, five symbol periods are shown making up a sample symbol stream. For example, in the first period, i.e., $S^1$, the PN sequence is rotated by an amount 6 as indicated by the length of the horizontal arrow. The PN sequences labeled $S^1$, $S^2$, $S^3$, $S^4$, $S^5$ are rotated by an amount 6, 0, 3, 2, 5, respectively.

An illustration of the structure of the packet used in the communication protocol of the communications system of the present invention wherein the preamble comprises a single non-zero rotated symbol is shown in FIG. 3. The structure of the packet, generally referenced 10, of the present invention comprises a preamble 12, an L byte data field 14 and a Cyclic Redundancy Check (CRC) field 16. The preamble portion comprises a series of non rotated symbols denoted by $S_0$ followed by a symbol $S_\alpha$ shifted by a known predetermined amount a, followed by zero or more non rotated symbols. For illustrative purposes, the transmitter scheme of the present invention is described using a sequence of symbols in the preamble portion of the packet that comprises at least one symbol having a known non-zero shift.

Optionally, more than one symbol with a known non-zero shift may be transmitted in the preamble. Such a preamble is illustrated in FIG. 4. The second symbol $S_\beta$ has a predetermined shift of β. Alternatively, if only one symbol is transmitted with a known shift, i.e., $S_\alpha$ either a gap or a symbol with zero shift ($S_0$) may be inserted after the preamble but before transmission of the data symbols. The data symbols are denoted by $S_\delta$ where δ refers to the particular shift assigned to that symbol. Note that the preamble may have any number of zero shift and non-zero shift symbols.

In addition, the number of symbols transmitted in the preamble having a known non-zero shift, i.e., $S_\alpha$, $S_\beta$, may be larger than the examples of one or two disclosed herein as shown in FIGS. 3 and 4. Note that any arbitrary shifts can be used so long as each shift is different than the shift assigned to the $S_0$ symbol, e.g., zero shifts. For example, the non-zero rotated symbol $S_\alpha$ in FIG. 3 is rotated by α=46 shift indexes. In the case of two non-zero rotated symbols $S_\alpha$, $S_\beta$, in FIG. 4, the rotation is equal to, for example, α=46, β=53 shift indexes. Note that the non-zero shifts used in the preamble is totally arbitrary. Whatever shifts are used by the transmitter, however, must be known a priori by the receiver in order to properly detect the reception of a valid packet. Note also that the So symbol sent in the preamble may have shifts other than zero shifts, as long as the shift is consistent throughout the preamble except for the non-zero rotated symbols, e.g., the Sa and Sp symbols.

In addition to rotation, the symbols in the preamble also are given a sign. For example, if the preamble comprises seven unrotated symbols, the signs of the symbols may be: +, +, +, −, +, −, −. In another embodiment, the shifts assigned to the symbols in the preamble are given by: 0, 0, 0, 0, 0, 32, 32, 0 and the signs are given by −1, −1, +1, −1, +1, +1, +1, −1. The number 32 represents the shift position (or rotation) out of 64 possible shift positions, i.e., the symbol generated by starting from the middle of the spreading Waveform.

CSK/DCSK Spread Spectrum Transmitter: First Embodiment

As described above, the communication system of the present invention comprises sending a preamble before the data. The preamble functions as a training sequence whereby a template in the receiver is dynamically updated so as to 'learn' the channel response to the predetermined training sequence. For each packet, the preamble is used to adapt the receiver to the channel conditions.

Two embodiments of the transmitter are disclosed wherein the differences between the embodiments lie in how the binary output of the PN sample ROM is encoded into symbols for transmission over the channel. A description of the first embodiment is presented below followed by a description of the second embodiment.

A block diagram illustrating a first embodiment of the transmitter of the present invention wherein the output of the sample ROM is Manchester encoded is shown in FIG. 5. The transmitter of the first embodiment, generally referenced 20, comprises an initial index calculation circuit 22, counter 26, PN sample ROM 24, Manchester encoder 28, gate 30, band pass filter (BPF) 36 and channel coupling circuitry 38.

A preamble sequence having a length of N symbols is transmitted before data is sent over the channel. The symbols are indexed from j=0 through N−1. Each symbol in the sequence is comprised of T samples. In the example presented herein, the PN sequence is divided into T=64 shift indexes. In the data portion, each symbol is rotated circularly at the transmitter by a specific number of sample positions denoted by $\delta_j$, the rotation of each symbol is effective to convey $\log_2 64=6$ bits of information. In addition, to the rotation, the sign $d_j$ of the symbol is used to convey an additional bit. Thus, each symbol is used to transmit a total of 7 bits of information.

With reference to FIG. 5, a host provides the data to be transmitted, including the header, i.e., preamble, data and CRC checksum sequence already generated. The host data to be transmitted is input to the initial index calculation circuit 22. The host data is used to determine the shift index that is between 0 and $2^n-1$, where n represents the number of bits transmitted per symbol (excluding the polarity bit). With 64 samples, the shift index is a number between 0 and $2^6-1=63$. In an alternative embodiment, the rate of transmission is halved but the bit rate is the same. In this case, each symbol comprises 128 samples whereby each symbol is shifted by a number between 0 and 127.

The initial index into the PN sequence is calculated by dividing the length of the PN sequence by the total number of symbols in the encoding set, e.g., $2^n$, and multiplying by the shift index as given below in Equation 1.

$$\text{initial\_index} = \left(\frac{\text{PN sequence length}}{\text{number of possible shifts}}\right) \cdot \text{shift\_index} \quad (1)$$

For example, consider a PN sequence length equal to 128, number of possible shifts equal to 64, i.e., the total number of possible symbols or shift indexes. If the shift index, i.e., the host data input to the calculation circuit 22, is equal to 21 (can be from 0 to 63) the initial index is equal to 42. In this case, the symbols are spaced apart from each other by 2 and are equal to 0, 2, 4 . . . 124, 126.

The output of the initial index calculation circuitry 22 forms the MSB portion of the address inputs to the PN sample ROM 24. In this embodiment, multiple copies of the PN sequence are stored in a read only memory (ROM) device. The number of copies of the PN sequence is equal to the total number of symbols, e.g., 64. Each copy of the PN sequence is rotated by a different shift index. Thus, considering the example of a PN sequence length of 64 and 64 total symbols in the encoding set, then the PN sequence ROM comprises 64 copies of the PN sequence whereby the first PN sequence is rotated by 0, the second by 1, and so on up to the 64$^{th}$ sequence which is rotated by 63.

In a second example, consider a PN sequence length of 128 and 64 total symbols in the encoding set. In this case the PN sequence ROM comprises 64 copies of the PN sequence whereby the first PN sequence is rotated by 0, the second by 2, and so on up to the 64$^{th}$ sequence which is rotated by 126.

The LSBs of the PN sequence (sample) ROM is formed from the output of a counter 26. The counter is adapted to count modulo the PN sequence length. The counter is clocked by a suitable clock source at the same rate bits are to be clocked out of the sequence ROM. The counter is cleared every symbol period by a SYNC signal input to the clear input of the counter. The number of bits output of the counter depends on the length of the PN sequence. In the case of a 64 bit PN sequence length, 6 bits are output and in the case of 128 bit PN sequence length, 7 bits are output.

The bits output of the counter are input to the LSBs of the PN sequence ROM forming the lower portion of the address. The upper portion of the address is the output of the initial index calculation circuitry 22 which functions to select one of the PN sequences stored in the ROM. The counter output functions to cycle through the entire PN sequence for that symbol. The bits output from the PN Sequence ROM represent the PN sequence rotated in accordance with the shift index, i.e., the data input from the host. The size required of the PN sequence ROM is thus given by (total number of symbols*PN sequence length)×1. For example, for 64 symbols and 64 sequence length, a PN sequence ROM of size 4K×1 is required. For 64 symbols and 128 sequence, a PN sequence ROM of size 8K×1 ROM is required.

The output of the PN sequence ROM is input to a Manchester encoder 28 which functions to encode the bits input thereto as either a Manchester '0' or '1' depending on the input. The Manchester encoder 28 always creates a level shift with each bit being either a 0 to 1 shift or a 1 to 0 shift. Note that the Manchester encoder may be replaced by any other circuit or function block that is capable of providing the desired spectral characteristics. In the second embodiment described hereinbelow, for example, a FIR filter is used in place of the Manchester encoder. The Manchester encoder functions to convert the digital waveform, i.e., bit stream, into an analog waveform, also referred to as an encoded waveform.

Note also that PN sequence ROM and the Manchester encoder operate at a particular clock rate. In one embodiment of the invention the clock rate is 32 MHz. The clock rate may, however, be any other rate as long as the components of the transmitter are adapted to operate according to the clock rate.

The output of the Manchester encoder is input to a logical gate 30 which comprises two gates 32, 34. Gate 32 being the non-inverting gate and gate 34 adapted to generate the complement of its input. The gates 32, 34 functions as output amplifiers generating the necessary drive currents required to drive the channel. Preferably the gates 32, 34 operate at CMOS levels and are adapted to have a tri-state control which is used when the system is in receive mode and the transmitter is temporarily shut off. Use of the inverting gate 34 functions to generate an inverted version of the output as well as the non-inverted output. This is useful when the following stage requires a differential input signal. Alternatively, a single gate may be used, either inverting or non-inverting, with or without tri-state control. Preferably the gate has tri-state control so as to be able to shut off the transmitter while receiving.

The differential output of the channel drive gates 30 is input to a band pass filter 36 so as to generate the desired spectrum. In the examples presented herein, the BPF 36 is an analog band pass filter preferably constructed as a symmetrical filter. The pass band of the filter is approximately 4 to 20 MHz. Although asymmetrical (unidirectional) filters are easier to design and construct, a symmetrical filter is preferable in the case when the filter is used in the transmit path and the receive path. The BPF filter 36 is described in more detail hereinbelow.

The output of the BPF 36 is input to the channel coupling circuitry 38. The channel coupling circuitry functions to passively couple the analog signal output of the BPF 36 to the channel. In this example, the channel comprises the AC powerline. Alternatively, the channel may comprise other types of media such as optical fiber, twisted pair, RF, IR, etc. One skilled in the electrical arts can modify the channel coupling circuitry so as to adapt the output signal to the desired channel medium.

CSK/DCSK Spread Spectrum Transmitter: Second Embodiment

Figure 6:
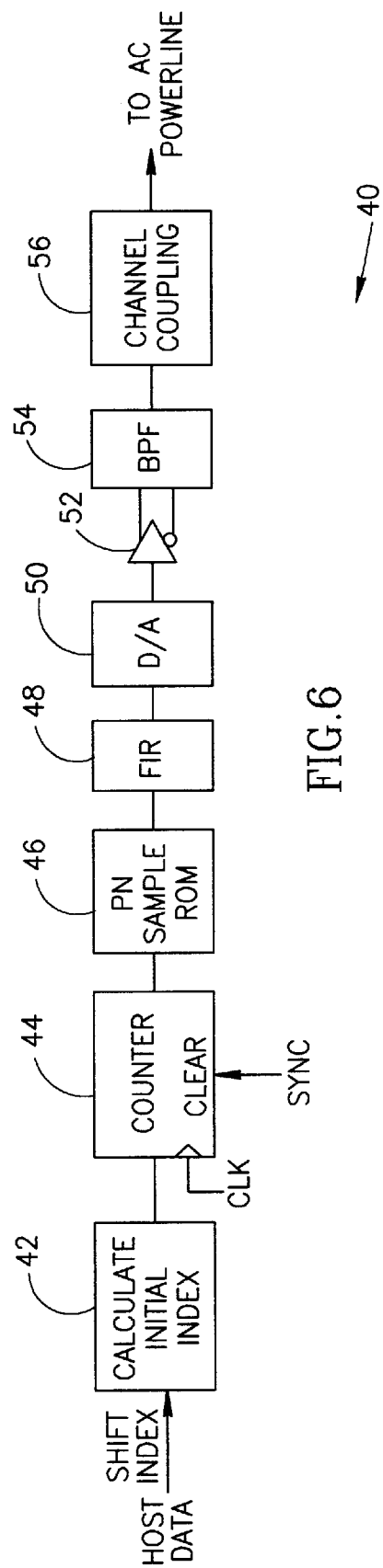
FIG. 6 is a block diagram illustrating a second embodiment of the transmitter of the present invention wherein the output of the sample ROM is input to an FIR.

A block diagram illustrating a second embodiment of the transmitter of the present invention wherein the output of the sample ROM is input to an FIR filter is shown in FIG. 6. The transmitter of the second embodiment, generally referenced 40, comprises an initial index calculation circuit 42, counter 44, PN sample ROM 46, Finite Impulse Response (FIR) filter 48, D/A converter 50, amplifier 52, band pass filter (BPF) 54 and channel coupling circuitry 56.

Similarly to the transmitter of FIG. 5, a preamble sequence having a length of N symbols is transmitted before data is sent over the channel. The symbols $N_j$ are indexed from j=0 through N−1. Each symbol in the sequence is comprised of T samples, e.g., 64 or 128. Each symbol is rotated circularly by the transmitter by a specific number of sample positions denoted by $\lambda_j$. Thus, the rotation of each symbol is effective to convey, for example, $\log_2 64=6$ bits of information. In addition, to the rotation, the sign $d_j$ of the symbol is used to convey an additional bit. Thus, each symbol is used to transmit a total of 7 bits of information.

A host provides the data to be transmitted which includes the header, i.e., preamble, data and CRC checksum sequence already generated. The host data to be transmitted is input to the initial index calculation circuit 42. The host data is used to determine the shift index that is between 0 and $2^n-1$, where n represents the number of bits transmitted per symbol (excluding the polarity bit). With 64 samples, the shift index is a number between 0 and $2^6-1=63$. In an alternative embodiment, the rate of transmission is halved but the bit rate is the same. In this case, each symbol comprises 128 samples whereby each symbol is shifted by a number between 0 and 127.

The initial index into the PN sequence is calculated by dividing the length of the PN sequence by the total number of symbols in the encoding set, e.g., $2^n$, and multiplying by the shift index as given in Equation 1 above.

The output of the initial index calculation circuitry 42 is input to a counter 44 adapted to count modulo the length of the PN sequence. As opposed to the transmitter apparatus of FIG. 5, all the address inputs to the PN sample ROM 46 are taken from the output of the counter 44. The counter always counts a complete cycle of the PN sequence. It is preloaded, however, with an initial index corresponding to a position in the PN sequence where transmission is to begin for that particular symbol as represented by the shift index.

In this embodiment, only one copy of the PN sequence is stored in the read only memory (ROM) device. Each symbol time, the counter is loaded with the starting position of the PN sequence in accordance with the shift index and the counter is then clocked for a full sequence length. The output of the counter functions as the address to the PN sequence ROM.

The counter is adapted to count modulo the PN sequence length. The counter is clocked by a suitable clock source at the same rate bits are to be clocked out of the PN sequence ROM. The counter is loaded every symbol period by a SYNC signal input to the load input of the counter. The number of bits output of the counter depends on the length of the PN sequence. In the case of a 64 bit PN sequence length, 6 bits are output and in the case of 128 bit PN sequence length, 7 bits are output.

The size required of the PN sequence ROM depends on the number of bits simultaneously output from the ROM. Numerous configurations are possible such as outputting a single bit thus requiring a ROM of size T×1 (T being the length of the PN sequence).

In an alternative embodiment, the counter is removed and the initial index is input directly to the sample ROM. The sample ROM is adapted to output T bits with the number of entries of the complete PN sequence being the total number of symbols, e.g., 64. Each copy of the PN sequence is rotated by a different shift index. Thus, considering the example of a PN sequence length of 64 and 64 total symbols in the encoding set, then the PN sequence ROM comprises 64 copies of the PN sequence whereby the first PN sequence is rotated by 0, the second by 1, and so on up to the $64^{th}$ sequence which is rotated by 63.

In a second example, consider a PN sequence length of 128 and 64 total symbols in the encoding set. In this case the PN sequence ROM comprises 64 copies of the PN sequence whereby the first PN sequence is rotated by 0, the second by 2, and so on up to the $64^{th}$ sequence which is rotated by 126. In each case, the full length of the PN sequence is output in parallel.

The output of the PN sequence ROM 46 is input to a FIR filter 48. The FIR filter is constructed using standard FIR filter techniques. The FIR filter functions to provide the output signal with the desired spectral characteristics. Optionally, the FIR filter can be adapted to function as a band stop filter in addition to a band pass filter, with notches at one or more positions in the pass band to filter out specific frequencies in which transmission may not be permitted. The notch frequencies may correspond, for example, to frequencies or frequency bands in the amateur radio band. Considering an output signal pass band of 4 to 20 MHz, such amateur radio frequencies comprise 7, 10, 14 and 18 MHz.

Note that PN sequence ROM and FIR filter operate at a particular clock rate. In one embodiment of the invention the clock rate is 32 MHz. The clock rate may, however, be any other rate as long as the components of the transmitter are adapted to operate in accordance with the clock rate.

Figure 7:
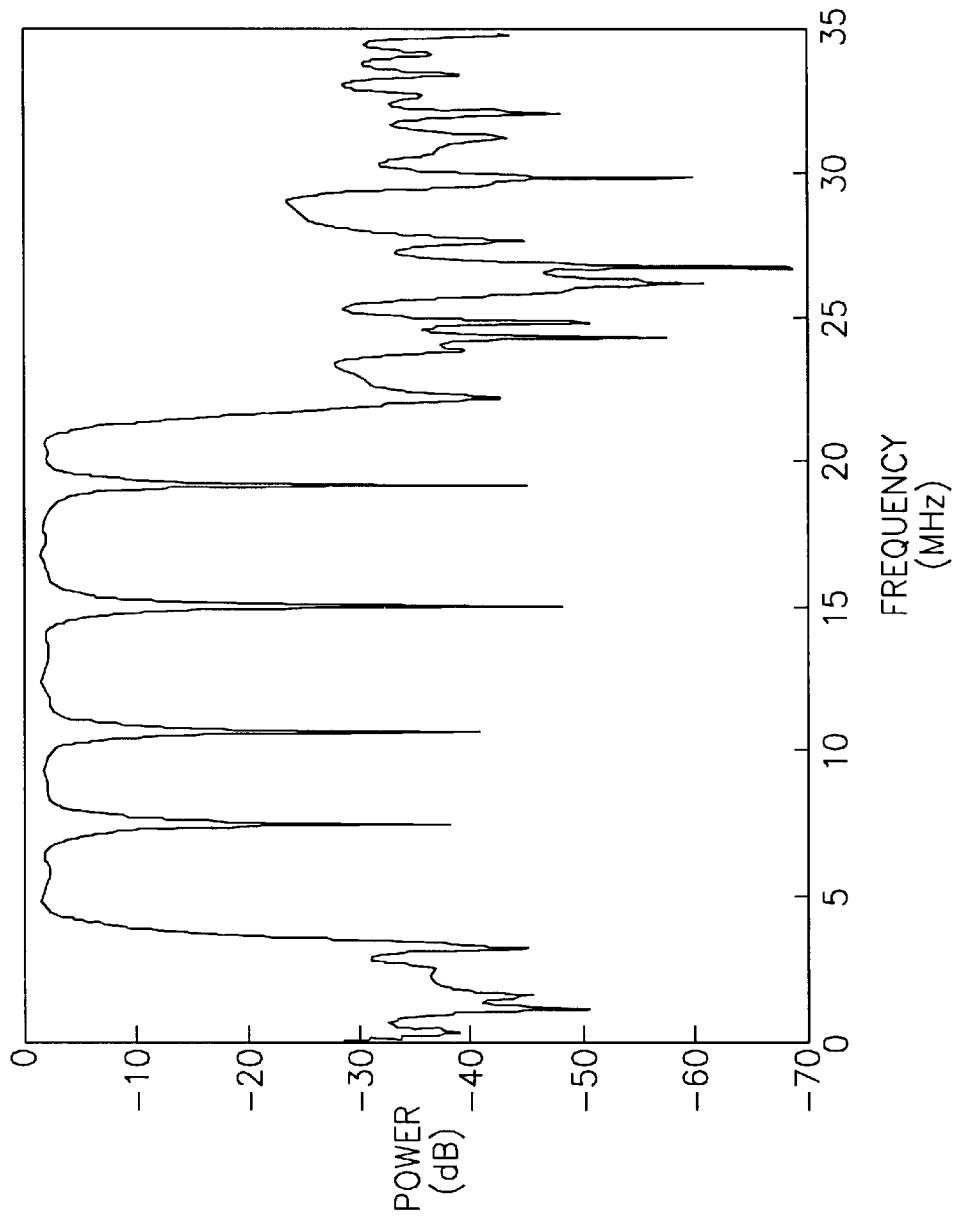
FIG. 7 is a graph illustrating the spectrum at the output of the FIR filter wherein the filter response comprises a pass band with a plurality of notches.

As an example, the FIR filter 48 may be constructed to have 128 taps wherein the tap coefficients are as given below in Table 1. Using these tap coefficients a filter can be constructed with a pass band of approximately 4 to 20 MHz and having significant reduction of power at the amateur radio frequencies listed above. A graph illustrating the spectrum at the output of the FIR filter having tap coefficients as given in Table 1 wherein the filter response comprises a pass band with a plurality of notches is shown in FIG. 7. A method of constructing such a filter is described in more detail below in connection with FIGS. 9A, 9B, 9C and 10. In this example, the filter output is quantized to 8 bits and the tap coefficients are quantized to 6 bits. The coefficient values are presented in decimal form but can be easily scaled to 6 bits whereby 31.5 represents 0. Coefficients less than 31.5 are negative and coefficients greater than 31.5 are positive.

TABLE 1

FIR Filter Tap Coefficients

| Tap | Coefficient |
|---|---|
| 0 | −0.00781 |
| 1 | 0.007813 |
| 2 | 0.007813 |
| 3 | 0.007813 |
| 4 | 0.007813 |
| 5 | 0.007813 |
| 6 | −0.00781 |
| 7 | −0.00781 |
| 8 | 0.007813 |
| 9 | 0.007813 |
| 10 | −0.00781 |
| 11 | −0.00781 |
| 12 | −0.00781 |
| 13 | −0.00781 |
| 14 | −0.00781 |
| 15 | 0.02344 |
| 16 | 0.007813 |
| 17 | −0.00781 |
| 18 | 0.007813 |
| 19 | 0.007813 |
| 20 | −0.00781 |
| 21 | 0.007813 |
| 22 | 0.02344 |
| 23 | −0.00781 |
| 24 | −0.02344 |
| 25 | −0.00781 |
| 26 | 0.02344 |
| 27 | 0.007813 |
| 28 | −0.00781 |
| 29 | −0.02344 |
| 30 | −0.02344 |
| 31 | −0.02344 |
| 32 | −0.00781 |
| 33 | 0.02344 |
| 34 | 0.03906 |
| 35 | 0.03906 |
| 36 | 0.03906 |
| 37 | 0.007813 |
| 38 | −0.05469 |
| 39 | −0.03906 |
| 40 | 0.05469 |
| 41 | 0.02344 |
| 42 | −0.08594 |
| 43 | −0.03906 |
| 44 | 0.05469 |
| 45 | 0.007813 |
| 46 | −0.02344 |
| 47 | 0.03906 |
| 48 | −0.03906 |
| 49 | −0.1172 |
| 50 | 0.02344 |
| 51 | 0.05469 |
| 52 | −0.00781 |
| 53 | 0.2109 |
| 54 | 0.3516 |
| 55 | −0.07031 |
| 56 | −0.4453 |
| 57 | −0.1953 |
| 58 | 0.08594 |
| 59 | 0.007813 |
| 60 | −0.08594 |
| 61 | 0.007813 |
| 62 | 0.07031 |
| 63 | 0.08594 |
| 64 | 0.1172 |
| 65 | 0.08594 |

TABLE 1-continued

FIR Filter Tap Coefficients

| Tap | Coefficient |
|---|---|
| 66 | 0.07031 |
| 67 | 0.007813 |
| 68 | −0.08594 |
| 69 | 0.007813 |
| 70 | 0.08594 |
| 71 | −0.1953 |
| 72 | −0.4453 |
| 73 | −0.07031 |
| 74 | 0.3516 |
| 75 | 0.2109 |
| 76 | 0.007813 |
| 77 | 0.05469 |
| 78 | 0.02344 |
| 79 | −0.1172 |
| 80 | −0.03906 |
| 81 | 0.03906 |
| 82 | −0.02344 |
| 83 | 0.007813 |
| 84 | 0.05469 |
| 85 | −0.03906 |
| 86 | −0.08594 |
| 87 | 0.02344 |
| 88 | 0.07031 |
| 89 | −0.03906 |
| 90 | −0.05469 |
| 91 | 0.007813 |
| 92 | 0.03906 |
| 93 | 0.03906 |
| 94 | 0.03906 |
| 95 | 0.02344 |
| 96 | −0.00781 |
| 97 | −0.02344 |
| 98 | −0.02344 |
| 99 | −0.02344 |
| 100 | −0.00781 |
| 101 | 0.007813 |
| 102 | 0.02344 |
| 103 | −0.00781 |
| 104 | −0.02344 |
| 105 | −0.00781 |
| 106 | 0.02344 |
| 107 | 0.007813 |
| 108 | −0.00781 |
| 109 | 0.007813 |
| 110 | 0.007813 |
| 111 | −0.00781 |
| 112 | 0.007813 |
| 113 | 0.007813 |
| 114 | −0.00781 |
| 115 | −0.00781 |
| 116 | 0.007813 |
| 117 | −0.00781 |
| 118 | −0.00781 |
| 119 | 0.007813 |
| 120 | 0.007813 |
| 121 | −0.00781 |
| 122 | −0.00781 |
| 123 | 0.007813 |
| 124 | −0.00781 |
| 125 | −0.00781 |
| 126 | 0.007813 |
| 127 | 0.007813 |

The output of the FIR filter can be any width. In this example, the output width is 8 bits which is input to a D/A converter 50. The input width of the DIA converter is adapted to correspond to that of the output of the FIR filter. The analog output of the D/A converter is input to an amplifier 52 which functions to provide the drive current to drive the channel medium, i.e., the power line, twisted pair cable, etc.

The type of amplifier used may be any suitable amplifier but is preferably constructed to match the input to the band pass filter 54. If the BPF comprises a differential input, the amplifier 52 should be adapted to generate a differential output. If the BPF comprises a single ended input, the amplifier 52 should be adapted to generate a single ended output. It is also preferable that the amplifier have a 3-state control for controlling its output.

The BPF functions similarly to the BPF 36 of the first embodiment transmitter as shown in FIG. 5. The output of the BPF 54 is input to the channel coupling circuitry 56. The channel coupling circuitry functions to passively couple the analog signal output of the BPF 54 to the channel. In this example, the channel comprises the AC power line. Alternatively, the channel may comprise other types of media such as optical fiber, twisted pair, RF, IR, etc. One skilled in the electrical arts can modify the channel coupling circuitry so as to adapt the output signal to the desired channel medium.

Note that the second embodiment is the preferred embodiment, although the rotated PN sequence generation technique of FIG. 6 can be utilized in the transmitter of FIG. 5 and vice versa. Likewise the Manchester encoder circuit of FIG. 5 can be used in place of the FIR filter and D/A converter combination of the transmitter of FIG. 6. An advantage of the transmitter of FIG. 5 is that it can be implemented at very low cost. The sample ROM, however, is limited to a single bit binary sequence. Advantages of the transmitter of FIG. 6 include (1) the ability to shape the spectrum of the output signal in a digital fashion and (2) the ability to represent any arbitrary waveform, e.g., chirp waveform, via the sample ROM.

In accordance with the invention, the PN sequence used in both embodiments may be replaced with any suitable modulation waveform such as a chirp waveform or any waveform having relatively good correlation properties.

BPF Filter Description

Figure 8:
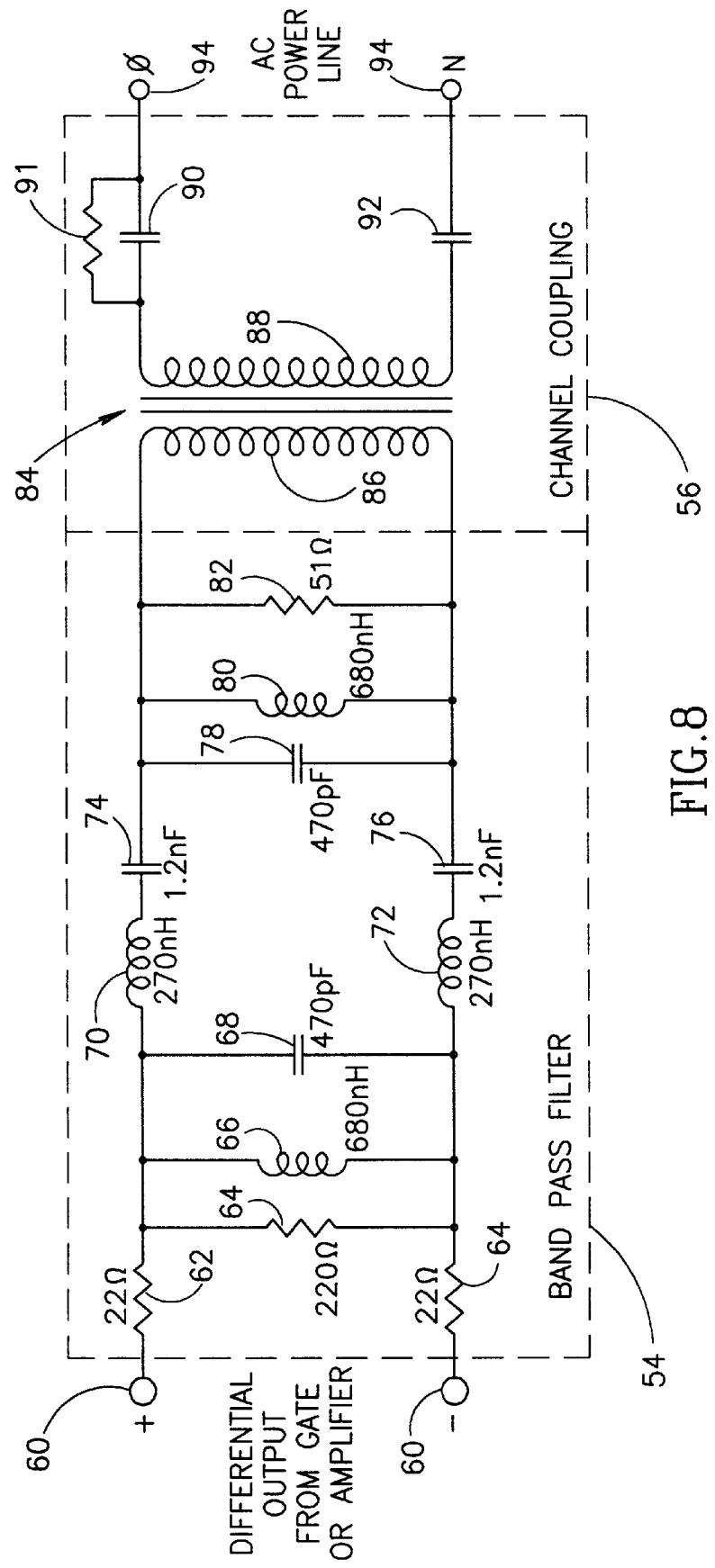
FIG. 8 are a block diagram illustrating the band pass filter and channel coupling circuitry of the transmitter in more detail.

A block diagram illustrating the band pass filter and channel coupling circuitry of the transmitter in more detail is shown in FIG. 8. The BPF 54 comprises two RLC tank circuits coupled by two series LC circuits. In operation, the differential output of the channel drive amplifier is input to a band pass filter in order to generate the desired spectrum. In the examples presented herein, the BPF is an analog band pass filter preferably constructed as a symmetrical filter. The pass band of the filter is approximately 4 to 20 MHz. Although asymmetrical (unidirectional) filters are easier to design and construct, a symmetrical filter is preferable in the case when the filter is used in both the transmit path and the receive path.

The differential input signals applied to the plus and minus terminals 60 and is fed to a first RLC tank circuit via series resisters 62, 64. The first RLC circuit comprises a resister 64, inductor 66 and capacitor 68. A second RLC circuit comprises resister 82, inductor 80 and capacitor 78. The first and second RLC circuits are coupled via series LC circuits comprising inductor 70/capacitor 74 and inductor 72/capacitor 76. The component values of a band pass filter suitable for use with the present invention are as shown in FIG. 8.

The output of the band pass filter is input to the channel coupling circuit 56. The coupling circuitry comprises a signal transformer 84 consisting of a primary winding 88 and a secondary winding 86. The primary winding is coupled to series capacitors 90, 92 which function as a bidirectional symmetric high pass filter for coupling the transmitter to the AC power line via phase and neutral terminals 94. Resister 91 in parallel with capacitor 90 functions to discharge capacitor 90 when the device is removed from the AC power line.

Notch Filter Construction Method

As described previously, the FIR filter 48 (FIG. 6) may be constructed such that the frequency response comprises one or more notches in the frequency domain. An example frequency response is shown in FIG. 7. The following filter design method is applicable wherever notches are desired in the frequency response of a filter and where the phase response of the filter is not critical. One skilled in the electrical arts could apply the filter construction method of the present invention to numerous other transmitters. The use of the filter construction method with the transmitter of the present invention is presented for illustrative purposes only and is not intended to be limiting in any way.

In many applications such as the present one, the phase response is not critical since the receiver is insensitive to variations of phase in the signal. It is particularly suitable for use with the spread spectrum transmitter of the present invention, since the filter can be considered part of the channel in the design, the phase of the channel is not critical to operation of the communication system.

Figure 9A:
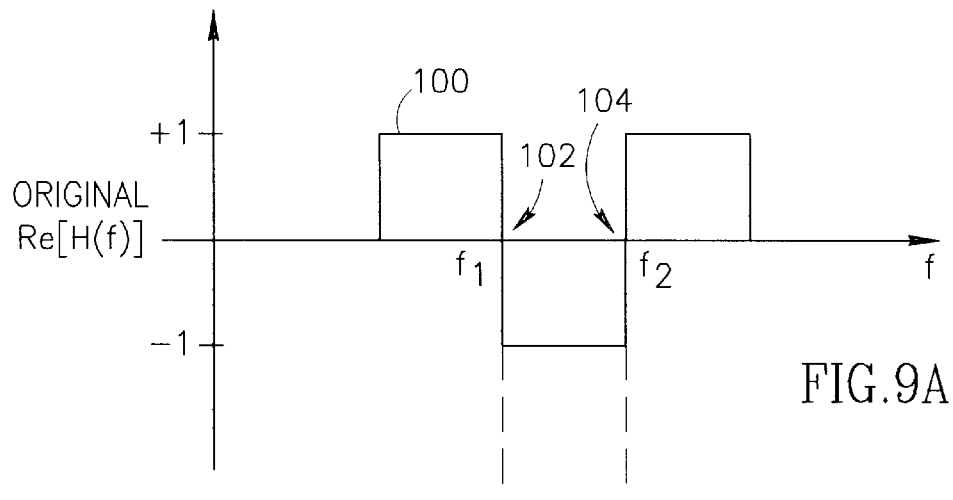
FIGS. 9A, 9B and 9C illustrate the technique of constructing a filter having one or more notches in the frequency domain.
Figure 9B:
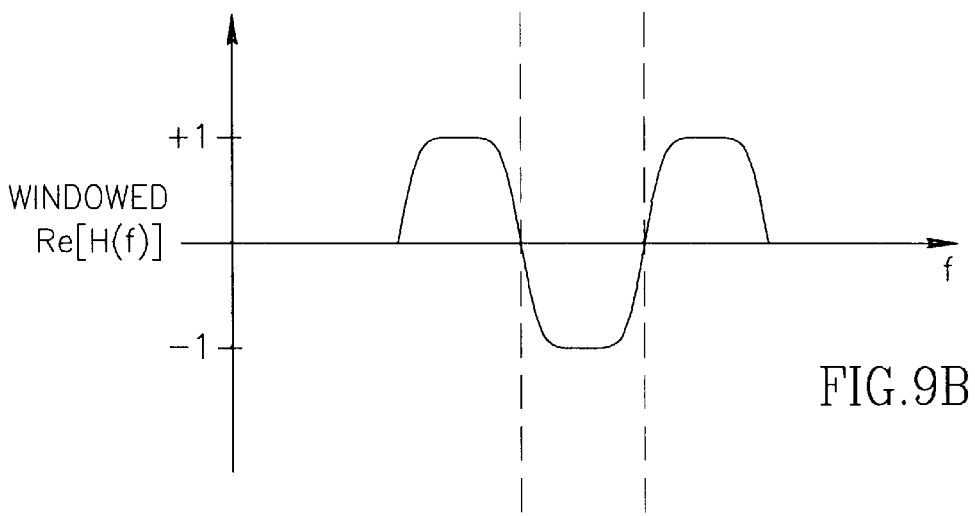
Figure 9C:
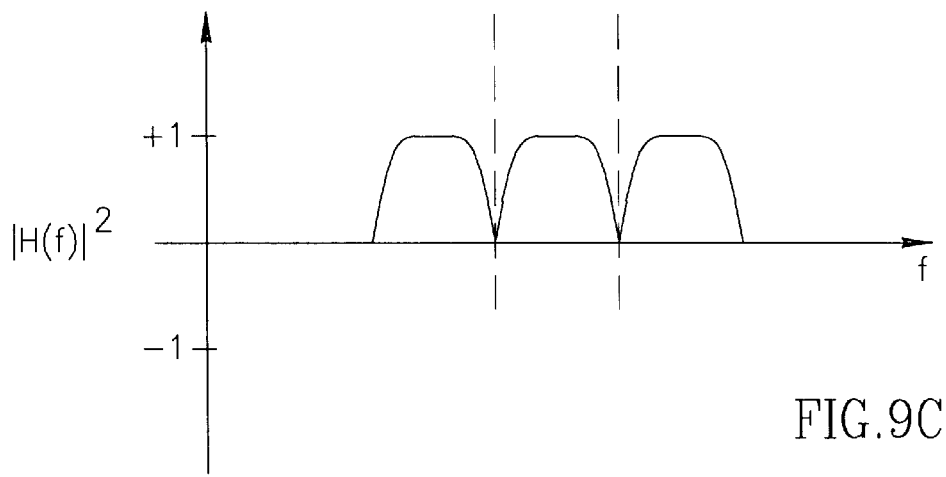
Figure 10:
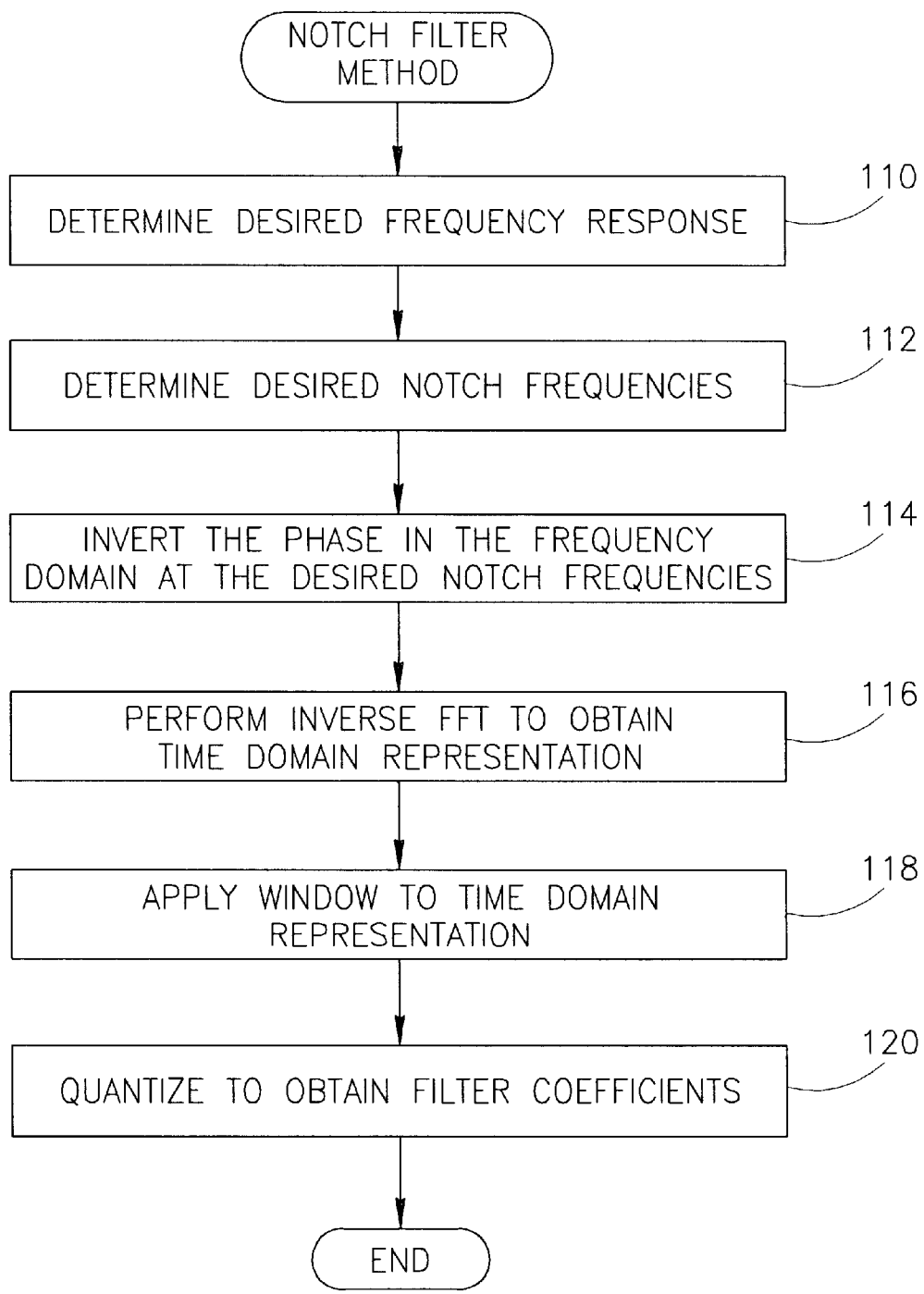
FIG. 10 is a flow chart illustrating the method of constructing a filter so as to have one or more notches in the frequency domain.

An illustration of the technique of constructing a filter having one or more notches in the frequency domain is shown FIGS. 9A, 9B and 9C. A flow chart illustrating the method of constructing a filter so as to have one or more notches in the frequency domain is shown in FIG. 10. With reference to FIGS. 9A, 9B, 9C and 10, the first step is to determine the desired frequency response of the filter (step 110). Then, the locations of the desired notches are determined (step 112). For each notch desired, the phase is inverted at the notch frequency (step 114). Alternatively, the phase may be shifted in a continuous fashion wherein the shift may vary with frequency that can be used to vary the peak to average ratio of the output.

The resulting frequency response is shown in FIG. 9A. Shown is an example frequency response used to illustrate the principles of the present invention. Note that one skilled in the art can apply the principles of the invention to numerous other frequency responses as well. The response shown (referenced 100) represents the real portion of the frequency response H(f), i.e., Re[H(f)]. Two notches are shown at frequencies $f_1$ (referenced 102) and $f_2$ (referenced 104). In accordance with the present invention, the phase is inverted at $f_1$ and again at $f_2$. Thus, a notch will occur at each zero crossing of the frequency response.

An inverse FFT is then performed on the frequency response so as to generate a time domain representation of the response (step 116). A window function is then applied, e.g., Kaiser window, which functions to smooth the transitions in the frequency domain (step 118). Note that any suitable window may be applied to the time domain representation. Note also that although the window function smoothes the transitions in the frequency domain, the frequency response is still real, therefore the transitions must pass through zero. The frequency domain representation of the response after the window function is applied is shown in FIG. 9B.

The results of the windowing operation are then quantized and filter coefficients (i.e., filter taps) are obtained after scaling, etc. the results (step 120). Considering the power response, i.e., the magnitude of the response squared, a filter response as shown in FIG. 9C is obtained. Note that the response is entirely positive and that the notches appear as desired at frequencies $f_1$ and $f_2$.

In accordance with the present invention, the width of the notches can be controlled by (1) varying the frequency response at the zero crossings, (2) choosing different windows to be applied to the time representation of the response and (3) varying the number of taps. For example, the width of the notch can be narrowed by increasing the number of taps and vice versa. In addition, the width of the notch can be widened by smoothing the transition at the zero crossing. Assuming the original values were +1, 0, −1, this can be achieved by smoothing the transition to +1, +½, 0, −½, −1. Conversely, the notch can be narrowed by making the transition more abrupt.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A transmitter for use in a spread spectrum communications system, comprising:

an initial index calculator adapted to generate an initial index in accordance with a shift index;

a sequence memory adapted to store multiple copies of sample's of a modulation waveform sequence, each copy having a circular rotation applied thereto corresponding to a different shift index, wherein an upper portion of an address to said sequence memory is formed from the output of said initial index calculator and a lower portion lower portion of said address to said sequence memory is formed from the output of a counter; and a counter adapted to count the length of said modulation waveform sequence so as to cause samples of one of said copies of said modulation waveform sequence corresponding to said shift index to be output of said sequence memory.

2. The transmitter according to claim 1, wherein said modulation waveform comprises a Pseudo Noise (PN) sequence.

3. The transmitter according to claim 1, wherein said modulation waveform comprises a chirp waveform.

4. The transmitter according to claim 1, wherein said initial index is calculated in accordance with the following:

$$\text{initial\_index} = \left(\frac{\text{PN sequence length}}{\text{number of possible shifts}}\right) \cdot \text{shift\_index}$$

wherein the shift index comprises the data input from a host data source.

5. The transmitter according to claim 1, wherein said sequence sample memory comprises a Read Only Memory (ROM) storage device.

6. The transmitter according to claim 1, further comprising:

an encoder operative to encode the rotated sequence sample stream so as to shift the spectrum thereof;

an amplifier for amplifying the output of said encoder for transmission over a channel;

a filter adapted to spectrally shape the signal output of said amplifier; and channel coupling circuitry operative to couple the signal output from said filter onto the channel.

7. The transmitter according to claim 6, wherein said amplifier is adapted to generate a differential output.

8. The transmitter according to claim 6, wherein said filter comprises a band pass filter having a pass band from 4 to 20 MHz.

9. The transmitter according to claim 6, wherein said filter comprises a band pass filter having one or more notches in its pass band.

10. The transmitter according to claim 6, wherein said filter comprises a symmetrical band pass filter.

11. The transmitter according to claim 6, wherein said channel coupling circuitry comprises a signal transformer coupled to a symmetrical high pass filter.

12. The transmitter according to claim 1, further comprising means for encoding an input bit as the sign of said rotated sequence.

13. The transmitter according to claim 6, wherein said encoder comprises a Manchester encoder.

14. The transmitter according to claim 6, wherein said amplifier comprises a non-inverting gate and an inverting gate adapted to be driven in parallel by the output of said encoder so as to generate a differential output signal.

15. The transmitter according to claim 6, wherein said amplifier comprises a single non-inverting gate adapted to be driven by the output of said encoder.

16. The transmitter according to claim 15, wherein said single non-inverting gate comprises tri-state control means.

17. The transmitter according to claim 6, wherein said amplifier comprises a single inverting gate adapted to be driven by the output of said encoder.

18. The transmitter according to claim 17, wherein said single inverting gate comprises tri-state control means.

19. A transmitter for use in a spread spectrum communications system, comprising:

an initial index calculator adapted to generate an initial index corresponding to a position in a modulation waveform sequence where transmission is to begin for a particular symbol represented by an input shift index;

a sequence memory adapted to store samples of a modulation waveform sequence; and a counter preloaded with said initial index and adapted to count the length of said modulation waveform sequence for each symbol to be transmitted so as to cause samples of said modulation waveform sequence circularly rotated by an amount corresponding to said shift index to be output of said sequence memory.

20. The transmitter according to claim 19, wherein said modulation waveform comprises a Pseudo Noise (PN) sequence.

21. The transmitter according to claim 19, wherein said modulation waveform comprises a chirp waveform.

22. The transmitter according to claim 19, further comprising means for encoding input data as the sign of said rotated sequence.

23. The transmitter according to claim 19, wherein said initial index is calculated in accordance with the following:

$$\text{initial\_index} = \left( \frac{\text{PN sequence length}}{\text{number of possible shifts}} \right) \cdot \text{shift\_index}$$

wherein the shift index comprises input data.

24. The transmitter according to claim 19, wherein said sequence sample memory comprises a Read Only Memory (ROM) storage device.

25. The transmitter according to claim 19, further comprising:

a first filter operative to encode the rotated sequence sample stream so as to shift the spectrum thereof;

an amplifier for amplifying the output of said first filter for transmission over a channel;

a second filter adapted to spectrally shape the signal output of said amplifier; and channel coupling circuitry operative to couple the signal output from said second filter onto the channel.

26. The transmitter according to claim 25, wherein said first filter comprises a Finite Impulse Response (FIR) filter.

27. The transmitter according to claim 25, wherein said first filter comprises a Finite Impulse Response (FIR) filter adapted to function as a band pass filter.

28. The transmitter according to claim 27, wherein said band pass filter comprises a pass band from 4 to 20 MHz.

29. The transmitter according to claim 25, wherein said first filter comprises a Finite Impulse Response (FIR) filter band pass filter having one or more notches in its pass band.

30. The transmitter according to claim 25, wherein said second filter comprises a symmetrical band pass filter.

31. The transmitter according to claim 25, wherein said channel coupling circuitry comprises a signal transformer coupled to a symmetrical high pass filter.

32. The transmitter according to claim 25, wherein said amplifier comprises a differential amplifier adapted to output a differential output signal.

33. In a spread spectrum communications system, a method for transmitting symbols onto a communication channel, said method comprising the steps of:

providing a sequence memory comprising samples of a modulation waveform sequence;

calculating an initial index into said sequence memory in accordance with a shift index;

counting a full symbol period so as to cause a sample bit stream comprising said modulation waveform sequence circularly rotated in accordance with said initial index to be output of said sequence memory;

encoding the sample bit stream output of said sequence memory; and coupling the encoded sample bit stream onto said communication channel.

34. The method according to claim 33, wherein said modulation waveform comprises a Pseudo Noise (PN) sequence.

35. The method according to claim 33, wherein said modulation waveform comprises a chirp waveform.

36. The method according to claim 33, further comprising means for encoding input data as the sign of said rotated sequence.

37. The method according to claim 33, wherein said sequence sample memory comprises a Read Only Memory (ROM) storage device.

38. The method according to claim 33, further comprising the step of amplifying said encoded sample bit stream sufficiently to drive said communication channel.

39. The method according to claim 33, further comprising the step of spectrally shaping said encoded bit stream to generate notches at one or more frequencies.

40. A method for constructing a filter, said method comprising the steps of:

determining a first frequency response for said filter;

inverting the phase of said first frequency response to generate zero crossings at frequencies where notches are desired to generate a second frequency response;

performing an inverse Fast Fourier Transform (FFT) on said second frequency response to generate a first time domain representation;

applying a windowing function to said first time domain representation to generate a second time domain representation; and generating filter tap coefficients from said second time domain representation.

41. A transmitter for use in a spread spectrum communications system, comprising:

an initial index calculator adapted to generate an initial index in accordance with a shift index;

a sequence memory adapted to store multiple copies of samples of a modulation waveform sequence, each copy having a circular rotation applied thereto corresponding to a different shift index, wherein an upper portion of an address to said sequence memory is formed from the output of said initial index calculator and a lower portion lower portion of said address to said sequence memory is formed from the output of a counter;

a counter adapted to count the length of said modulation waveform sequence so as to cause samples of one of said copies of said modulation waveform sequence corresponding to said shift index to be output of said sequence memory;

an encoder operative to encode the rotated sequence sample stream to shift the spectrum thereof;

a filter adapted to spectrally shape the signal output of said encoder, wherein said filter comprises one or more notches in the frequency domain whose phase alternates in sign, wherein a zero crossing in the frequency response occurs at each desired notch frequency; and channel coupling circuitry operative to couple the signal output from said filter onto a channel.

42. The transmitter according to claim 41, wherein said channel coupling circuitry comprises:

a digital to analog (D/A) converter operative to convert the output of said filter to an analog output signal;

amplifier means operative to receive said analog output signal and to sufficiently drive said channel over which said symbols are to be transmitted; and interface circuitry adapted to couple the output of said amplifier to said channel.

43. A transmitter, comprising:

means for generating a transmission signal in accordance with input data;

a filter adapted to spectrally shape said transmission signal, wherein said filter comprises one or more notches in its frequency domain having phase alternating in sign, wherein a zero crossing in the frequency response occurs at each desired notch frequency; and channel coupling circuitry operative to couple the filtered signal output from said filter onto a channel.

44. The transmitter according to claim 43, wherein said channel coupling circuitry comprises:

a digital to analog (D/A) converter operative to convert the output of said filter to an analog output signal;

amplifier means adapted to receive said analog output signal and to sufficiently drive said channel; and interface circuitry adapted to couple the output of said amplifier to said channel.

45. In a spread spectrum communications system, a method for transmitting symbols onto a communication channel, said method comprising the steps of:

providing a sequence memory for storing samples of a modulation waveform sequence;

calculating an initial index into said sequence memory in accordance with a shift index;

counting a full symbol period so as to cause a sample bit stream comprising said modulation waveform sequence circularly rotated in accordance with said initial index to be output of said sequence memory;

encoding the sample bit stream output of said sequence memory;

filtering said sample bit stream output of said sample memory utilizing a filter constructed to have one or more notches in its frequency response whereby the phase of said frequency response is inverted at each desired notch frequency such that a zero crossing is generated for each notch frequency desired in the frequency response, and whereby a windowing function is applied to a time domain representation of said response to generate windowed results therefrom and windowed results quantized to yield filter tap coefficients therefrom; and coupling the encoded sample bit stream communication channel.

* * * * *